United States Patent [19]

Miyauchi et al.

[11] 4,079,230

[45] Mar. 14, 1978

[54] LASER WORKING APPARATUS

[75] Inventors: Tateoki Miyauchi; Jun'ichi Nakabayashi, both of Yokohama; Tomoyoshi Mikoshiba, Chigasaki, all of Japan

[73] Assignee: Hitachi, Ltd., Japan

[21] Appl. No.: 627,279

[22] Filed: Oct. 30, 1975

[30] Foreign Application Priority Data

Nov. 1, 1974 Japan .............................. 49-125562

[51] Int. Cl.² .............................................. B23K 9/00
[52] U.S. Cl. ............................................... 219/121 L
[58] Field of Search .................... 219/121 L, 121 LM; 350/6, 7, 285; 331/94.5 R

[56] References Cited

U.S. PATENT DOCUMENTS

| 1,647,631 | 11/1927 | Ives | 350/6 X |
|---|---|---|---|
| 1,840,799 | 1/1932 | Waddell | 350/6 X |
| 2,975,668 | 3/1961 | Eckel | 350/6 |
| 3,083,611 | 4/1963 | Ziolkowski et al. | 350/6 X |
| 3,110,762 | 11/1963 | Frank | 350/6 X |
| 3,226,721 | 12/1965 | Gould | 350/6 X |
| 3,259,751 | 7/1966 | Sachs | 350/6 X |
| 3,552,834 | 1/1971 | Vogl et al. | 350/6 |
| 3,746,421 | 7/1973 | Yoder | 350/6 |
| 3,827,787 | 8/1974 | Ripart | 350/285 |
| 3,881,802 | 5/1975 | Helava | 350/285 X |
| 3,947,093 | 3/1976 | Goshima et al. | 219/121 L |

Primary Examiner—J. V. Truhe
Assistant Examiner—Fred E. Bell
Attorney, Agent, or Firm—Craig & Antonelli

[57] ABSTRACT

The laser light emitted from a laser generator is cast on two prisms which have the same angle of deflection and are supported rotatably by support members so as to be rotated about the optical axis of the laser light in the opposite directions at the same speed. The laser beam scanned through the rotations of the two prisms is focussed on a work piece by a convergence lens so that the work piece is linearly scanned for laser-working. Moreover, there are provided a pair of scanning sections, each comprising such a pair of prisms as described above, the scanning sections being so arranged that the directions of scanning the laser beam by the respective sections may be perpendicular to each other. The rotational speeds of the prisms of each scanning section is so controlled as to subject the spot of the laser beam to two-dimensional scanning for laser-working a work piece.

5 Claims, 10 Drawing Figures

PRIOR ART

LASER WORKING APPARATUS

BACKGROUND OF THE INVENTION

1. FIELD OF THE INVENTION

The present invention relates to a laser working apparatus provided with a mechanism for scanning laser beam.

2. DESCRIPTION OF THE PRIOR ART

The conventional laser working apparatus using laser light scanning system has had a structure as shown in FIGS. 1 and 2. The laser working apparatus comprises, as shown in FIG. 1, a swingable mirror 2 driven by a drive mechanism (not shown) such as a galvanometer or an electric motor, and a convergence lens 3 for converging laser beam 1 reflected from the mirror 2 upon a work piece 4. The laser beam 1 emitted by the laser generator (not shown) is reflected and scanned by the swinging mirror 2. The scanned laser light is focussed through the convergence lens 3 upon the work piece 4, which is to be worked by the laser beam in a predetermined manner. In order to scan a laser light having a large diameter and to incise a work piece, the swing mirror 2 must be of the size enough to cover the beam size. However, such a large mirror necessarily has large inertia so that it is difficult in practical aspect to provide a drive mechanism for swinging the mirror having large inertia at high speed. Moreover, with the conventional laser working apparatus, if the positional precision in laser beam scanning must be improved, the hysteresis characteristic of the drive mechanism must be taken into consideration to control the swing motion of the mirror. Accordingly, there arises a drawback that the size of the drive mechanism is undesirably large while high technical level is needed in controlling the scanning of laser beam. Further, in the laser working apparatus as shown in FIG. 1, the laser beam is deflected through an angle twice as large as the angle of rotation of the mirror 2 so that if it is desired to scan the laser beam across a small interval, the rotational angle of the mirror 2 must be controlled within a small range. This leads to a technical difficulty.

The conventional laser working apparatus as shown in FIG. 2 comprises a convergence lens 5 for converging laser light 1, an X-Y table 6 which carries a work piece 4 along two axes, and two electric motors 7 to move the X-Y table 6 along the two axes. The laser beam converged through the lens 5 is relatively scanned with respect to the work piece 4 mounted on the X-Y table 6, by moving the table 6 along the two axes through driving the motors 7. In order to overcome the inertia of the table 6 and to subject the table to a smooth reciprocating motion, a motor having a large power must be provided. It is also practically difficult to reciprocate the X-Y table at high speeds. In addition, the laser working apparatus shown in FIG. 2 has a drawback that if it is desired to improve the scanning precision, the X-Y table 6 must be position-controlled with high accuracy.

SUMMARY OF THE INVENTION

A main object of the present invention is to provide a laser working apparatus in which laser beam having a large diameter is scanned by a small and light optical system and in which a work piece can be treated with a small spot of laser beam over a large area.

Another object of the present invention is to provide a laser working apparatus in which a pair of prisms are rotated in the opposite directions at the same speed and the laser light through the prisms are converged into a beam spot by a convergence lens so that a work piece is linearly or two-dimensionally scanned by a small spot of laser beam over a large distance.

Yet another object of the present invention is to provide a laser working apparatus in which the intensity of the laser beam is modulated at any scanning position by detecting the rotational phases of the prisms so that a desired segment of line or figure can be easily cut in a work piece by the laser beam.

The feature of the present invention is as follows. There are provided a plurality of prisms through which the laser light emitted from the laser generator is deflected by predetermined angles. The prisms are rotatably supported by the support members mechanically connected with the rotating mechanism which rotates the prisms about the optical axis of the laser beam. The laser beam, having passed through the plural prisms, is focussed upon a work piece by means of a convergence lens. The focussed spot of laser beam scans the work piece by rotating the plural prisms. According to another feature of the present invention, there are provided two prisms which deflect the laser light emitted from the laser generator by the same angle. The prisms are rotatably supported by the support members coupled to a rotating mechanism so as to be rotated in the opposite direction at the same speed about the optical axis of laser beam. The laser beam, having passed through the two prisms, is focussed upon a work piece by a convergence lens. The work piece is linearly scanned by the focussed spot of laser beam due to the rotations of the two prisms in the opposite directions and at the same speed. In this case, the two prisms must be so located that when one prism is 180° out of phase with respect to the other prism, that is, the apex edges of the two prisms are diametrically opposite to each other, the entrance side surface of the entrance side prism is parallel to the exit side surface of the exit side prism. According to yet another feature of the present invention, there are provided two pairs of prisms, each pair of them are rotated in the opposite direction at the same speed. These pairs of prisms are parallelly placed in the path of the laser beam so that the spot of laser beam focussed on the work piece is subjected to two dimensional scanning.

DETAILED DESCRIPTION OF THE PREFERRED EMBODIMENTS

Figure 1:
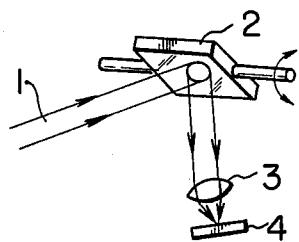
FIG. 1 shows a main part of conventional laser working apparatus in which the laser beam is scanned by the swing motion of reflection mirror.
Figure 2:
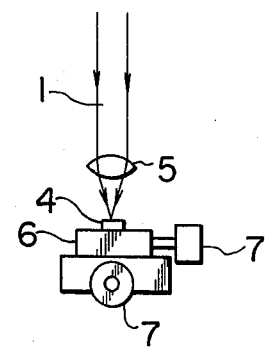
FIG. 2 shows a main part of a conventional laser working apparatus in which the work piece is scanned by the laser beam due to the movement of the table on which the work piece is mounted.
Figure 3:
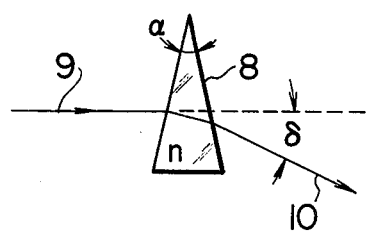
FIGS. 3, 4 and 5 illustrate the principle of an laser working apparatus as an embodiment of the present invention.
Figure 4:
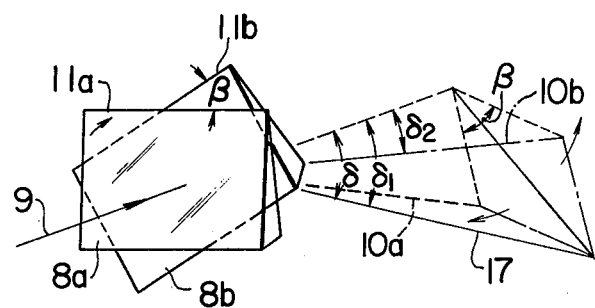
Figure 5:
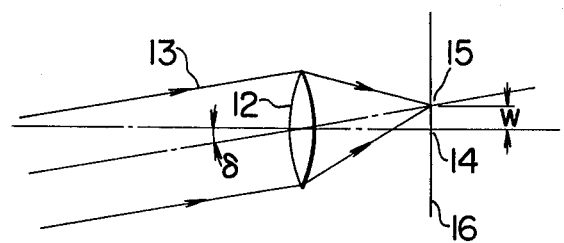

The present invention will be described below by way of embodiment with the aid of the attached drawings. FIGS. 3 to 5 illustrate the principle of the laser working apparatus according to the present invention. In FIG. 3, the incident light 9 upon a prism 8 having a refractive index $n$ and the shape of an isosceles triangle in cross section with a vertical angle $\alpha$, leaves the prism 8 as a deflected beam 10 having a deflection angle $\delta$. The angle $\delta$ of the deflection is approximately given, if the vertical angle $\alpha$ is small, by the following formula (1).

$$\delta = (n - 1)\alpha \qquad (1)$$

When the prism 8 is rotated about the optical axis of the incident light 9 (represented as dashed line), the deflected light 10 having a deflection angle $\delta$ also rotates so that it describes a circle on a plane perpendicular to the optical axis and located at a distance from the prism 8. Two such prisms 8a and 8b are prepared and placed parallel in the path of the laser beam 9, as shown in FIG. 4. Let the deflection angles of the deflected light 10a and 10b from the prisms 8a and 8b be represented respectively by $\delta_1$ and $\delta_2$ and let the angle defined between the apex edges 11a and 11b of the prisms 8a and 8b be denoted by $\beta$. Then, the resultant angle $\delta$ of deflection due to the refractions through the two prisms 8a and 8b is represented by the formula (2) below.

$$\delta = \delta_1^2 + \delta_2^2 + 2\delta_1\delta_2 \cos \beta \qquad (2)$$

If two prisms 8a and 8b such that $\delta_1 = \delta_2$, are used, the synthesized angle $\delta$ of deflection yields to the cosine function of $\beta/2$, that is, $$\delta = 2\delta_0 \cos\beta/2 \qquad (3)$$

where $\delta_1 = \delta_2 = \delta_0$.

Namely, when two prisms having the same angle $\delta_0$ of deflection are rotated in the opposite directions at the same speed, the light having passed through the two prisms performs a linear motion since two circular motions in the opposite direction at the same angular velocity result in a linear one. The formula (3) gives as the variable range of $\delta$ the following formula (4).

$$-2\delta_0 \leq \delta \leq 2\delta_0 \qquad (4)$$

Now, reference should be made to FIG. 5. When incident light 13 having an angle $\delta$ of deflection relative to the optical axis of a convergence lens 12, falls upon the lens 12 having a focal distance of $f$, the light 13 is focussed on a point 15 in a focal plane 16, the distance between the focus 14 and the point 15 being $w$. The distance $w$ is given by the formula (5) below.

$$w = \delta f \qquad (5)$$

Therefore, it follows from the formulas (3) and (5) that the linear motion of the light spot in the focal plane 16, when the resultant deflected light 17 through the two prisms 8a and 8b is focussed by the convergence lens 12, is described by the following formula (6).

$$w = 2\delta_0 f \cos\beta/2 \qquad (6)$$

Figure 6:
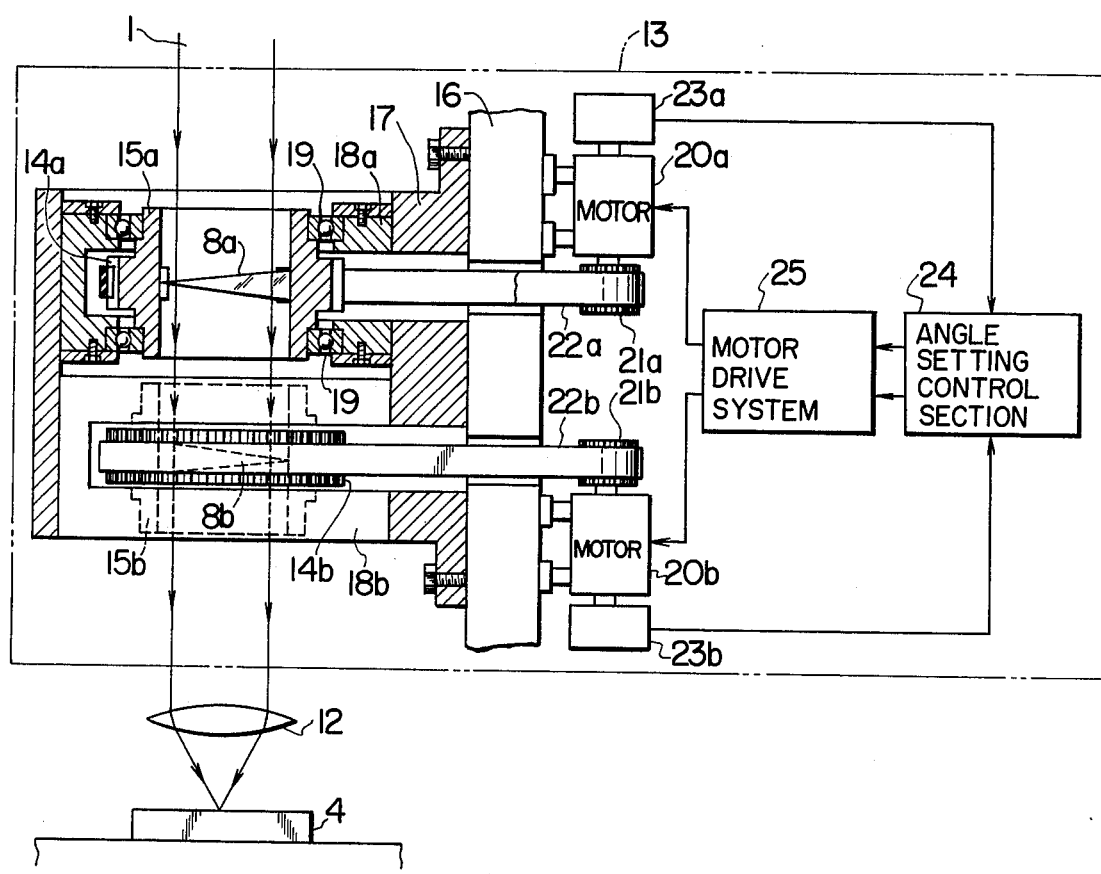
FIGS. 6 and 7 show laser working apparatuses as embodiments of the present invention.

FIG. 6 shows a laser working apparatus as a first embodiment of the present invention. In FIG. 6, the box of broken line encloses a laser light scanning section 13. Wedge-shaped prisms 8a and 8b are made of the same material and have the shape of an isosceles triangle in corss section having a vertical angle $\alpha$. The prisms 8a and 8b are mounted rigidly on cylindrical support members 15a and 15b around which teeth 14a and 14b are provided to serve as cogwheels, in such a manner that when the angle $\beta$ between the apex edges of the prisms 8a and 8b is 180°, the surface of the prism 8a on the entrance side of the laser beam 1 and the surface of the prism 8b on the exit side of the laser beam are parallel to each other. The cylindrical support members 15a and 15b are rotatably supported on bearings 19 fitted in bearing casing 18a and 18b arranged parallel along the optical axis of the laser beam 1 and fixed by screws to a hausing 17 rigidly attached onto a frame 16 by means of screws. The teeth 14a and 14b of the cylindrical support members 15a and 15b are mechanically engaged via cogged belts 22a and 22b with driving cogwheels 21a and 21b fixedly attached to the drive shafts of motors 20a and 20b fixed to the frame 16, serving as rotary drive mechanisms. To the motors 20a and 20b are coupled respectively rotary encoders 23a and 23b which indicate the angular positions of the motor shafts. The output signals of the rotary encoder 23a and 23b are sent to an angle setting control section 24. The outputs of the angle setting control section 24 are sent to a motor drive system 25 including power sources and the motor drive system 25 controls the motors 20a and 20b in such a manner that both the motors are rotated with the difference between the phase angles of their rotors kept constant. A convergence lens 12 for converging the laser light having passed through the prisms 8a and 8b, is stationarily placed between the prism 8b and a work piece 4. With this structure, the laser light 1, collimated and having a large diameter, is passed through the prisms 8a and 8b rotated in the opposite directions at the same speed and therefore subjected to linear scanning. The laser light 1 having passed through the prisms 8a and 8b impinges upon the convergence lens 12 so that the work piece 4 is linearly scanned for laser working. This embodiment has two motors 20a and 20b and these motors are controlled by the rotary encoders 23a and 23b, the angle setting control section 24 and the motor drive system 25. However, in order to merely rotate the prisms 8a and 8b in the opposite directions at the same speed, the motor 20b and the rotary encoder 23b may be both omitted. In such a case, it is, of course, necessary to engage the drive cogwheel 21b via a cogwheel with the drive cogwheel 21a attached to the motor 20a. With these structures, through the linear scanning of the laser light having a large diameter the work piece 4 can be linearly scanned over a wide range by the laser light having a small diameter.

Figure 7:
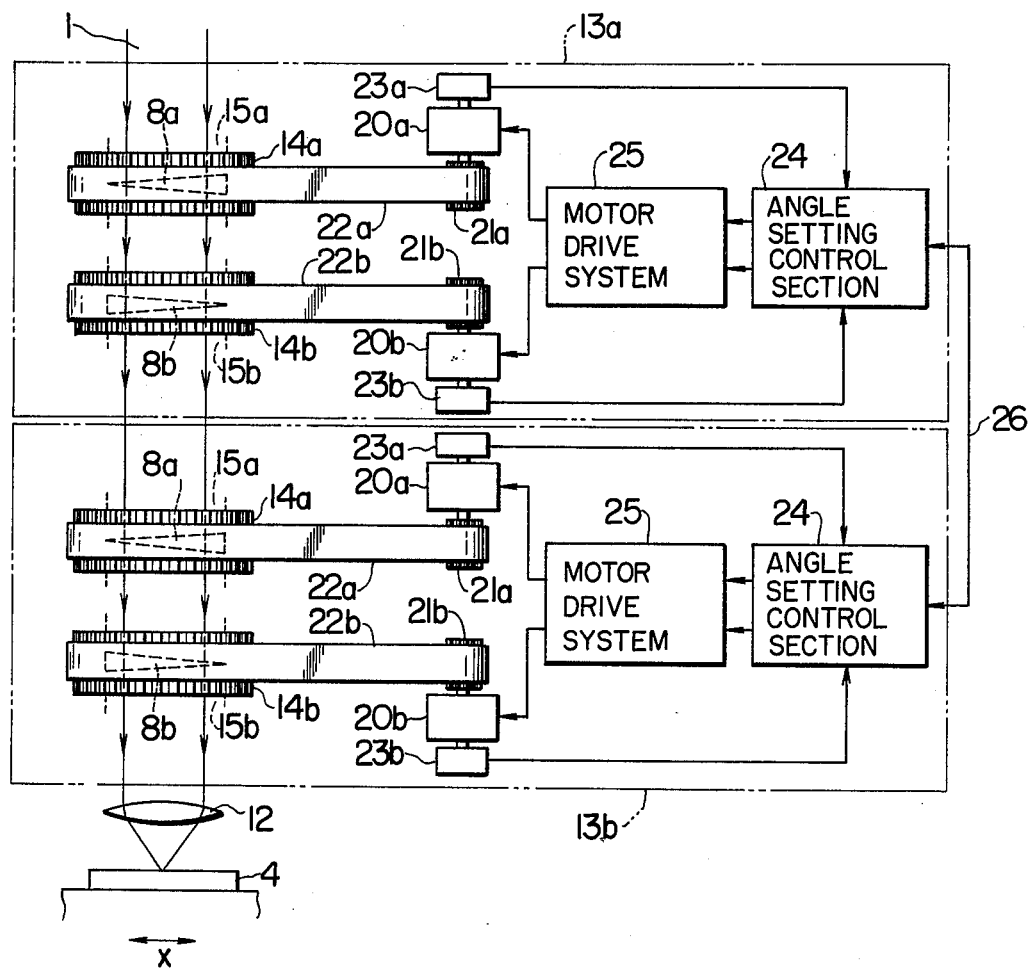

FIG. 7 shows a laser working apparatus as a second embodiment of the present invention. Each of sections 13a and 13b arranged along the optical axis of the laser light 1, has the same function as the laser light scanning section 13 in FIG. 6. Each section 13a or 13b has a pair of prisms rotated in the opposite direction at the same speed. The sections 13a and 13b are so arranged with respect to each other that the direction of scanning of laser light by the section 13a may be perpendicular to the direction of scanning of laser light by the section 13b. This is done by connecting the angle setting control sections 24 in the laser light scanning sections 13a and 13b by a conductor line 26 in such a manner that the scanning phases of the sections 13a and 13b are at right angles with each other. Accordingly, the collimated laser light 1 having a large diameter is scanned, for example, in the x direction as indicated in FIG. 7 and in the y direction perpendicular to the sheet of FIG. 7, by the sections 13a and 13b. The scanned light is sent through a convergence lens 12 so that the work piece 4 is two-dimensionally scanned for laser working by a small spot of laser beam.

Figure 8:
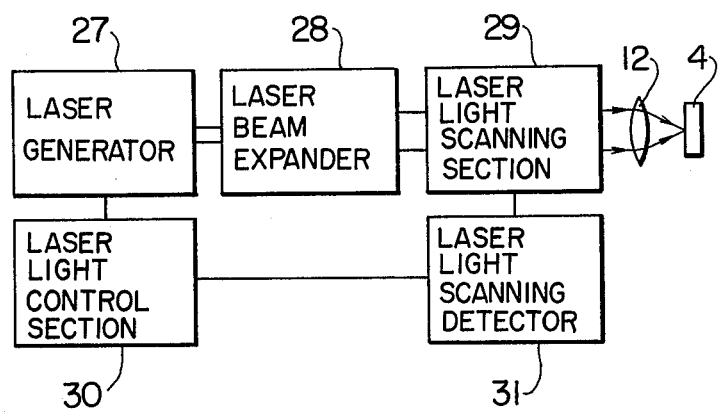
FIGS. 8 and 9 schematically show laser working apparatuses as embodiments of the present invention.

FIG. 8 schematically shows a laser working apparatus as a third embodiment of the present invention. In FIG. 8, a work piece 4 and a convergence lens 12 are the same as those shown in FIGS. 6 and 7. Reference numeral 27 indicates a laser generator such as argon laser apparatus; 28 a beam diameter expander which enlarges the diameter of the laser beam emitted from the laser generator 27; 29 a laser light scanning section which comprises such a section 13 or a pair of sections 13a and 13b as described above, each consisting of prisms 8a and 8b and which scans the diameter-enlarged laser beam emitted from the beam diameter expander 28; 30 a laser light control section which performs the intensity control or the on-off control of the laser light emitted from the laser generator 27; and 31 a laser light scanning detector which detects the rotational phases of the prisms 8a and 8b of the laser light scanning section 29 in accordance with the signals from the angle setting control sections 24 of the laser light scanning sections 13 or 13a and 13b and which delivers to the laser light control section 30 a signal to control the laser light. The laser beam emitted from the laser generator 27 has its beam diameter enlarged by the expander 28 and at the same time collimated. The collimated and diameter-enlarged laser beam is sent to the laser light scanning section 29 and the scanned beam is converged through the convergence lens 12 upon the work piece 4 so that the work piece 4 is scanned for laser working by a small spot of laser beam. In this case, the angle setting control section 24 of the laser light scanning section 29 causes the prisms 8a and 8b to rotate in the opposite directions at the same speed and the laser light scanning detector 31 detects the rotational phases of the prisms 8a and 8b, delivers to the laser light control section 30 the signal to perform the on-off control of laser light and provides laser light having any desired intensity or performs the on-off control of the laser light, at any scanning position. In this way, by detecting the difference between the rotational phases of the prisms 8a and 8b and by performing the intensity modulation or the on-off modulation of laser light at predetermined scanning positions, any portion of the line or surface to be scanned can be worked with any desired intensity of laser light, so that laser work over a wide range can be performed with laser beam having a small diameter.

Figure 9:
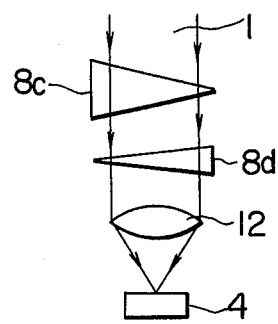
Figure 10:
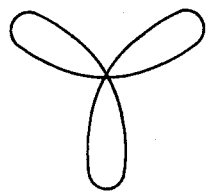
FIG. 10 shows an example of figure cut on a work piece by the laser working apparatus as shown in FIG. 9.

FIG. 9 shows the principal part of a laser working apparatus as a fourth embodiment of the present invention. Laser light 1 is passed through a rotating prism 8c having a large angle of deflection and a rotating prism 8d having a small angle of deflection and focussed through a convergence lens 12 upon a work piece 4 to be laser-worked. When the prisms 8c and 8d rotated in the opposite direction at the same speed, the spot of laser beam describes an ellipse in a focal plane. If the angles of deflection of the prisms 8c and 8d are respectively $\delta_1$ and $\delta_2$ and if the focal distance of the lens 12 is $f$, the ellipse has the major axis of $(\delta_1 = \delta_2)f$ and the minor axis of $(\delta_1 - \delta_2)f$. FIG. 10 shows the focus of the laser spot produced when two prisms having the same angle of deflection, arranged in the same configuration as shown in FIG. 9, are rotated in the opposite directions at speeds in the ratio of 2 : 1. If two or three prisms having the same or different angles of deflection are used and if the prisms are rotated in the same or different directions at the same or different speeds, sometimes at speeds varying during every rotation, then the locus of the laser beam spot in the focal plane can be represented by the point P(x, y) moving in accordance with the equations (7) belows, which describes an ellipse and a folium in special cases.

$$\left. \begin{array}{l} x = \sum_{i=1}^{n} \gamma i \cos(\omega it + \theta oi) \\ \\ y = \sum_{i=1}^{n} \gamma i \sin(\omega it + \theta oi) \\ \qquad n \geq 2 \end{array} \right\} \quad (7)$$

where $\gamma i$ is the distance between the focus of the convergence lens and the laser beam spot, which distance depends on the angle of deflection of the i-th prism and the focal distance of the convergence lens; $\omega i$ is the angular velocity of the i-th prism, $\omega it$ being the angle made by the bottom edge of the i-th prism at time t, with respect to the reference radius; and $\theta oi$ is the initial phase of the i-th prism.

As described above, the present invention, which is a laser working apparatus comprising a laser generator for emitting laser light; a plurality of prisms for deflecting the laser light; a plurality of supporting means for rotatably supporting the prisms about the optical axis of the laser light; drive means for rotating the plural prisms about the optical axis of the laser light; and a convergence lens for converging the laser light scanned through the rotation of the plural prisms upon a work piece, has an advantage that the laser light having a large diameter can be easily scanned and that a work piece can be laser-worked by a small laser spot over a wide range. Moreover, according to the present invention, a work piece can be linearly or two-dimensionally laser-worked with the spot of laser beam by continuously rotating the prisms. Further, according to the present invention, a desired one- or two-dimensional figure can be cut in a work piece with the laser beam spot by modulating the laser light at any scanning position by detecting the rotational phases of the prisms. In addition, curvilinear figures such as ellipses and folia can be cut in a work piece with the laser beam spot through the scanning of the laser light by arbitrarily selecting the angles of deflection, the angular velocities, and the rotational directions of the rotated prisms. Furthermore, according to the present invention, since the laser beam can be subjected to scanning by merely rotating the prisms continuously, the size and weight of the means for scanning laser light can be reduced and moreover the high speed scanning of laser beam for laser-working a work piece becomes possible.

We claim:

1. A linearly scanned laser working apparatus comprising:
   a laser generator for generating a parallel laser beam;
   a laser beam expander for expanding the diameter of said parallel laser beam emitted from said laser generator so as to obtain a parallel large laser beam having a diameter greater than that of said parallel laser beam;

at least two wedge shaped prisms for deflecting said parallel large laser beam through the same angle of deflection;

supporting means for rotatably supporting, via supporting members, said two prisms about the optical axis of said parallel large laser beam;

means for driving said supporting means in such a manner that said two prisms are rotated about said optical axis of said parallel large laser beam in opposite directions at the same rotational speed; and a convergence lens for focusing said large laser beam scanned through the rotations of said prisms upon a work piece, whereby said work piece is scanned linearly and worked by the small spot of said focused laser beam.

2. A linearly scanned laser working apparatus as claimed in claim 1, further comprising means for detecting the rotational phases of said prisms rotated by said drive means, and means for controlling said laser generator, wherein the on-off or the intensity modulation of said parallel laser beam from said laser generator is performed when the rotational phases of said prisms detected by said detecting means lie within predetermined ranges.

3. A laser working apparatus as claimed in claim 1, wherein said laser generator is comprised of an argon laser generator apparatus.

4. A two dimensional linearly scanned laser working apparatus comprising a laser generator for generating a parallel laser beam;

a laser beam expander for expanding said parallel laser beam emitted from said laser generator to a parallel large laser beam having a diameter greater than the diameter of said parallel laser beam;

two sets of two wedge-shaped prisms for deflecting said parallel large laser beam through the same angle of deflection;

supporting means for rotatably supporting, via supporting members, each set of said two prisms about the optical axis of said parallel large laser beam; and means for driving said supporting means in such a manner that, for each set, said two prisms are rotated about said optical axis of said parallel large laser beam in opposite directions at the same rotational speed, and being arranged in parallel along said optical axis of said parallel large laser beam, wherein the rotational directions and speeds of the prisms of said sets are so determined that the direction of scanning of said large laser beam by the rotated prisms of one of said two sets is perpendicular to the direction of scanning said large laser beam by the two prisms of the other set; and a convergence lens for focusing said large laser beam scanned through the two sets of prisms upon a workpiece, wherein said workpiece is scanned two dimensionally linearly worked by the small spot of said focused laser beam.

5. A laser working apparatus as claimed in claim 4, further comprising means for detecting the rotational phases of the one prisms of two sets rotated by the one drive means of two sets and means for controlling said laser generator wherein the on-off or the intensity modulation of said laser beam from said laser generator is performed when the rotational phases of said one prisms of two sets detected by said detecting means lie within predetermined ranges.

* * * * *